(No Model.) 4 Sheets—Sheet 1.

A. G. HAY & M. McINTYRE.
LUBRICATOR.

No. 499,541. Patented June 13, 1893.

FIG. I.

Witnesses
George Baumann
John Revell

Inventors.
Alexander G. Hay
Malcolm McIntyre
By their Attorneys
Howson and Howson

THE NORRIS PETERS CO., PHOTO-LITHO., WASHINGTON, D. C.

(No Model.) 4 Sheets—Sheet 2.

A. G. HAY & M. McINTYRE.
LUBRICATOR.

No. 499,541. Patented June 13, 1893.

Witnesses
George Baumann
John Revell

Inventors
Alexander G. Hay
Malcolm McIntyre
By their Attorneys,
Howsman Howson

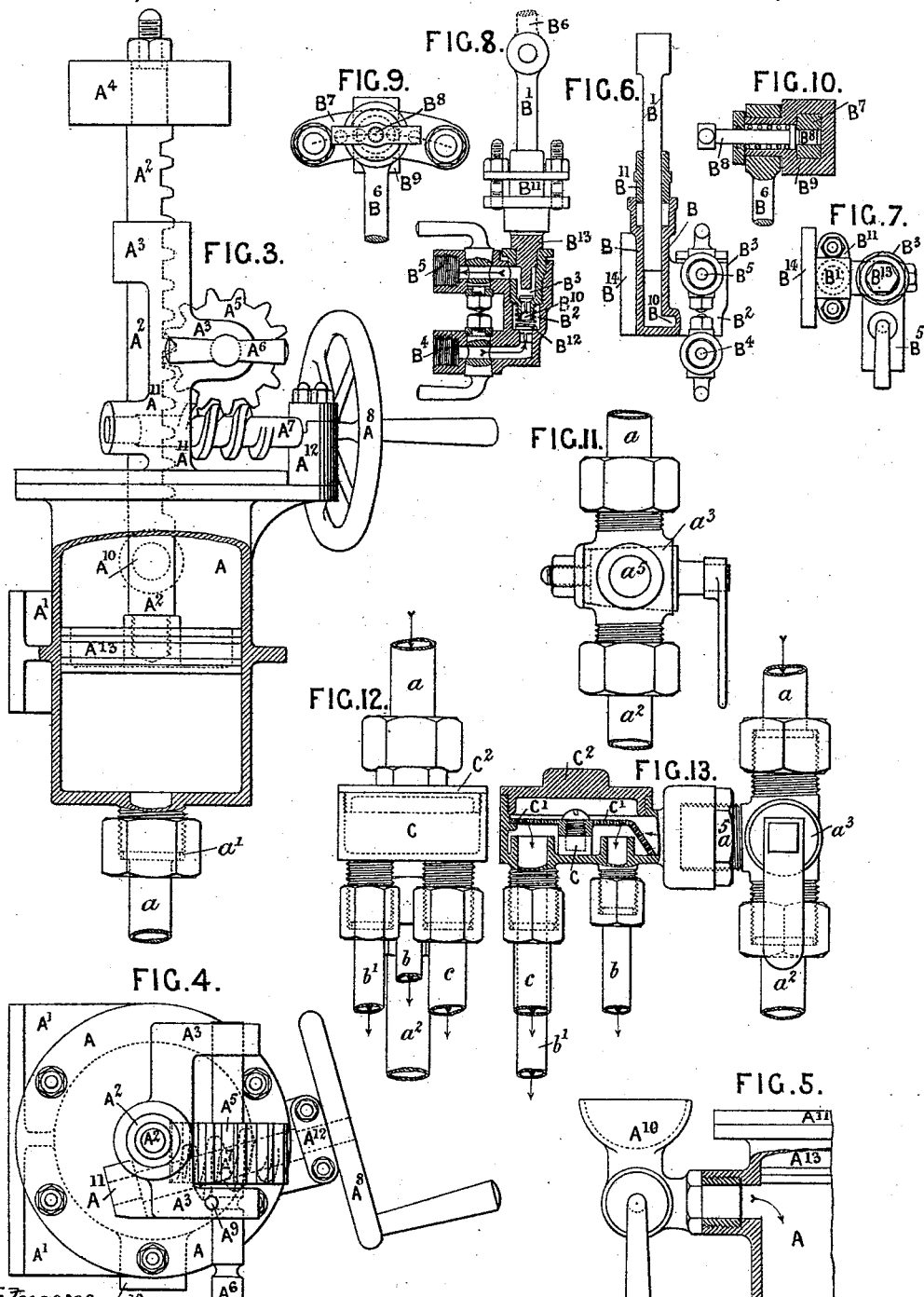

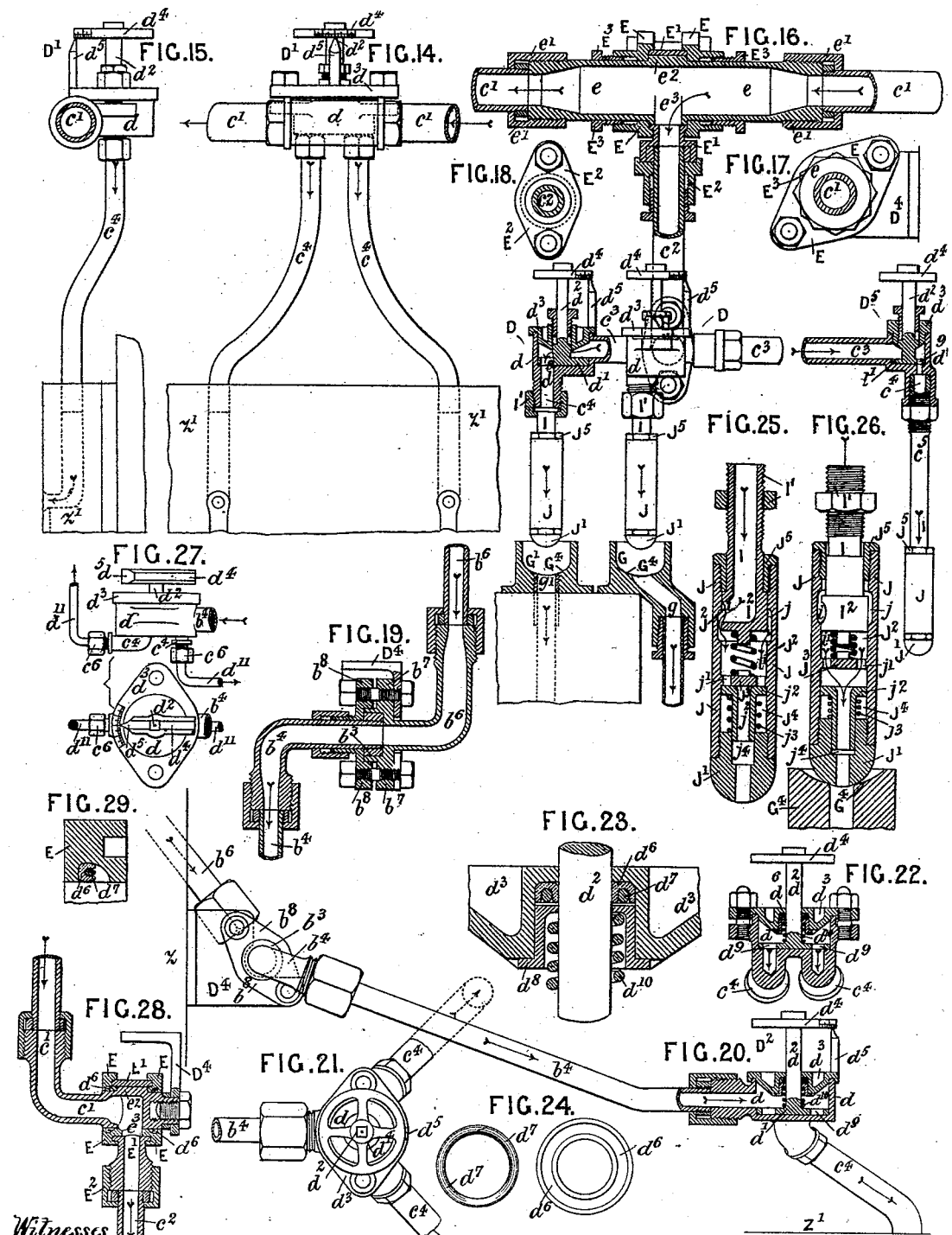

UNITED STATES PATENT OFFICE.

ALEXANDER G. HAY AND MALCOLM McINTYRE, OF GLASGOW, SCOTLAND.

LUBRICATOR.

SPECIFICATION forming part of Letters Patent No. 499,541, dated June 13, 1893.

Application filed January 13, 1891. Serial No. 377,585. (No model.) Patented in England October 2, 1890, No. 15,616.

*To all whom it may concern:*

Be it known that we, ALEXANDER GEBBIE HAY and MALCOLM McINTYRE, engineers, subjects of the Queen of Great Britain and Ireland, residing in Glasgow, in the county of Lanark, Scotland, have invented Improved Mechanism for Lubricating the Working Parts of Engines and other Machinery, (for which we have obtained Letters Patent in Great Britain, No. 15,616, dated October 2, 1890,) of which the following is a specification.

Our invention has reference to appliances particularly adapted for automatically lubricating the cylinders, bearings and other working parts of marine engines, but also applicable for lubricating the working parts of other engines and machinery.

The improvements consist in automatically pumping or raising or forcing the lubricant through distributing pipes and fittings in a positive regulated manner in contradistinction to conveying the oil or other lubricants by combined gravitation and capillary wicks and dippers to the separate oil boxes and bearings as heretofore; and also in special improved constructions of the pumps and other fittings applicable for this improved system of lubricating.

Figure 1:
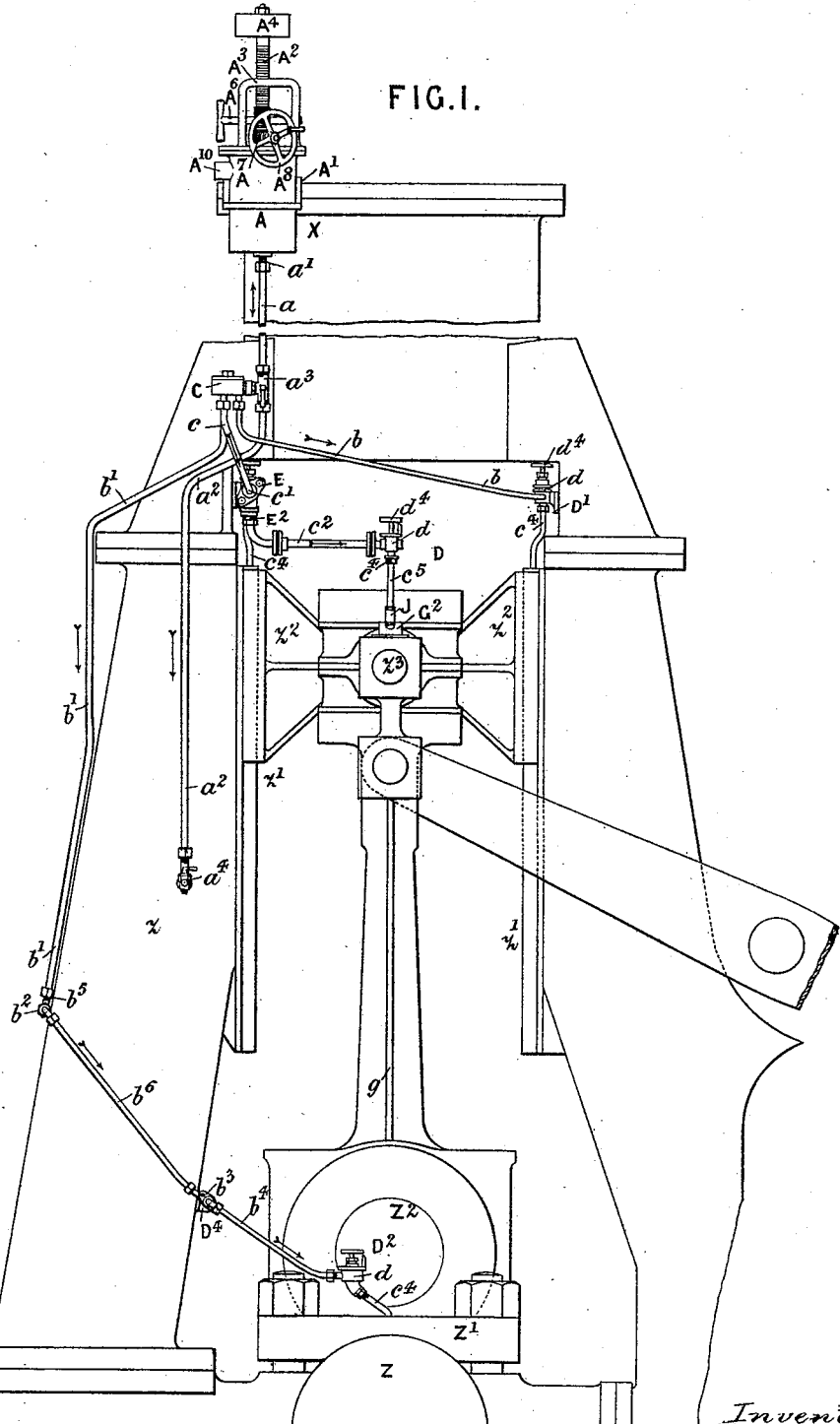
Figure 2:
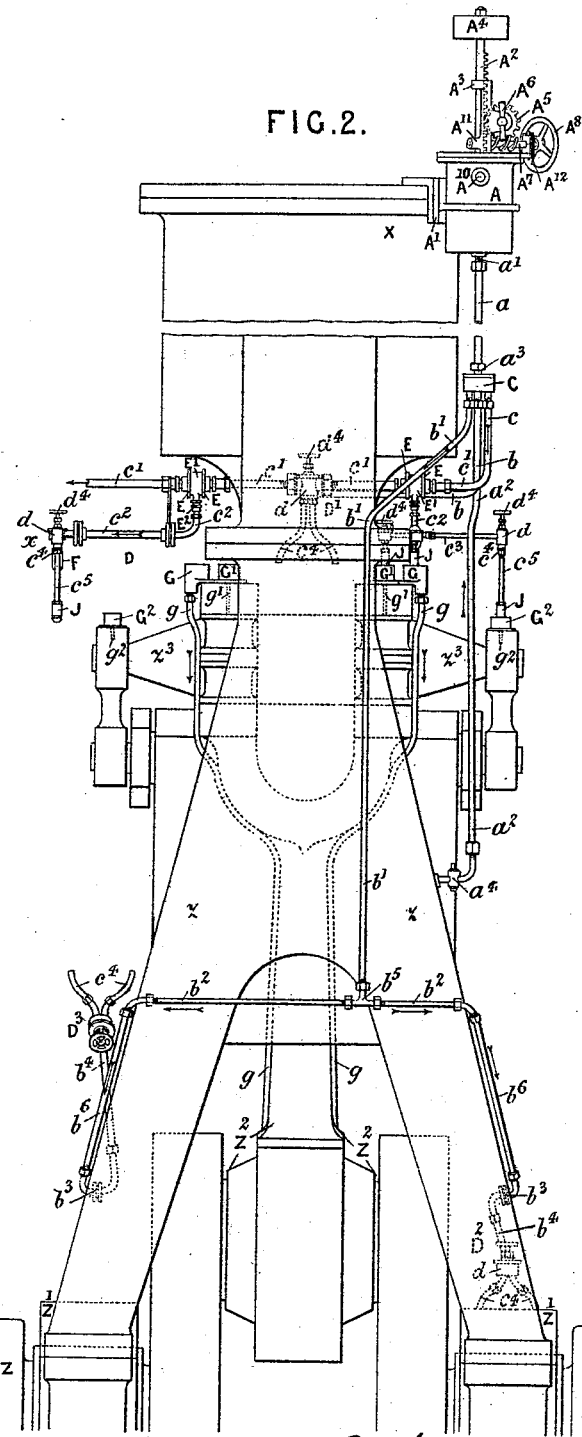

In the accompanying drawings, Figure 1 is an end elevation; and Fig. 2 a corresponding side elevation of sufficient of the framing of an inverted cylinder marine steam engine and the main working parts and bearings to show one general arrangement of our new system and improved fittings as applied thereto for lubricating. Figs. 3 and 4 show a detailed sectional elevation and plan respectively of the supply and service piston cistern A; and Fig. 5 is a view of the filler and cock $A^{10}$. Figs. 6 and 7 show a detached side sectional elevation and plan respectively; and Fig. 8 a corresponding section of a modified construction of service pump. Figs. 9, 10 and 11 are views of details of this pump. Figs. 12 and 13 show an end elevation and side section respectively of a distributing chest. Figs. 14 and 15 show side and edge views respectively of the supply disk cocks $d\,d'$. Fig. 16 shows an enlarged sectional elevation of the double swiveling or T-service branches $e\,E'$. Figs. 17 to 24 (inclusive) are detail views. Figs. 25 and 26 show sectional elevations of an automatic oil serving syringe dipper. Figs. 27, 28 and 29 are detail views.

The cistern A is preferably secured and fitted by flanged brackets at $A'$, to the top of the cylinder X, as shown in Figs. 1 and 2; or it might be to any other high fixed part of the engine, or to the bulkhead above the working parts to be lubricated. This cistern raises the oil to itself and presses it therefrom through the first main pipe $a$ coupled to its bottom branch at $a'$. As an alternative arrangement, an improved raising and forcing pump B shown in Figs. 6 and 7, and in corresponding section through the inlet and discharge valve box $B^2$, $B^3$, in Fig. 8, is fitted to some convenient part of the framing so as to be differentially reciprocated by the link $B^7$ and rod $B^6$ from any convenient moving part of the engine, the improved construction and action of which will be hereinafter referred to in reference to these figures.

The improvements further consist in a distributing service filter branch box C, and swiveling couplings $e\,E'$, and improved service disk valves $d\,d'$ and automatic acting oil serving syringe dippers J. The pipes and fittings may be led down and along either the front or back frames or columns $z$ of the engine.

The service piston barrel cistern A, shown in Figs. 1 to 5, consists of a bored cylindrical vessel A, with a working liquid-tight piston $A^{13}$ which may be fitted with cup liquid tight leather rings or other equivalent. This piston is secured to a piston rod $A^2$ working up through the cylinder cover and guide bracket $A''\,A^3$. A weight $A^4$ at the upper part of the piston rod $A^2$ tends to push the piston down and press out the oil from the vessel when filled and set in automatic working order. The lubricant is led in, and discharged through, the branch $a'$ at the lower part of the vessel A, under the piston $A^{13}$. The piston is raised, to draw up oil to fill the vessel, by means of a toothed rack cut on the one side of the piston rod $A^2$, and a spur pinion $A^5$ gearing therewith, and carried on a hand spindle $A^6$ turning and sliding in bearings in the bracket $A^3$. This pinion $A^5$ is actuated by a worm on the spindle $A^7$ carried in bearings $A^{11}\,A^{12}$, on the said bracket $A^3$. The spindle $A^7$ is actuated by a hand crank wheel $A^8$ on one end. The pinion $A^5$ is held in gear with the rack $A^2$ and actuating screw $A^7$ by a pin $A^9$ on the bracket $A^3$, taking into one of the grooves in the spindle $A^6$, see Fig. 4. When the cylinder A is filled and set to be discharged by the pressure of the piston $A^{13}$, and weight $A^4$, the pinion $A^5$ is pushed out of gear with the rack $A^2$. This is done by moving the spindle $A^6$ longitudinally in its bearings. It is held in this latter position by the pin $A^9$ entering another groove in the spindle $A^6$, which allows the piston rod $A^2$ and piston $A^{13}$ to force the oil down through the discharge pipe $a'$, $a$, to the improved service pipes, chambers, valves and fittings as hereinafter described.

Instead of the cistern A the pump B B' may be employed. This pump is preferably of an improved single acting plunger form, arranged to work either vertically or horizontally from any suitable moving part of the engine. In the vertical arrangement of this pump shown in Figs. 6 to 8, the plunger B' is a spindle of a small size as from half an inch to an inch, this maximum being large enough for most cases. The bored cylinder or pump B is fitted with a deep gland stuffing box B" to guide the piston rod B', the inner end of which is made to fit and work fluid tight in the cylinder. The valve box $B^2$ and the inlet and discharge branches $B^4$, $B^5$ are at one side of and cast in one with, the cylinder B with a bracket flange $B^{14}$, on one side for bolting the whole to any part of the engine or machinery framing. The inlet and discharge branches $B^4$ and $B^5$ are both provided with regulating cocks as seen in Fig. 8. The outer end of the plunger rod B' is formed with a joint eye to be connected to and reciprocated by the free end of a connecting rod $B^6$ from any moving part of the engine. The other end of the rod $B^6$ is connected to the part $B^9$ which embraces, and is adapted to be shifted upon, a quadrant or segmental link $B^7$.

Figs. 9 and 10 are respectively front and cross sectional views of this part of the mechanism. The rod $B^6$ is adjustably connected to the quadrant $B^7$ by means of a spring pin $B^8$, entering one of the several holes in the quadrant so that the stroke of the pump may be varied to approximately draw and deliver any regulated quantity of the oil from any ordinary supply cistern placed either above or below the apparatus. When the plunger B' is on its outward stroke the oil is drawn through the inlet branch $B^4$ and valve $B^{12}$, into the inlet valve chest $B^2$, then through a branch $B^{10}$, which connects the valve chest to the lower end of the cylinder B. When the plunger B' is on its inward stroke it forces the oil out through the same valve chamber $B^2$ and up through a discharge valve $B^3$, fitted above the inlet valve $B^{12}$ in the same chamber, and out through the discharge branch $B^5$, as indicated by the arrows in Fig. 8 to the service pipe $a$. The upper end of the valve box $B^2$ is bored and chased, so as to have fitted in it an annular outlet valve chamber with a screw plug $B^{13}$ in its upper end, to regulate the lift of the discharge valve $B^3$. This annular discharge valve plug $B^{13}$ has an annular discharge chamber round it, with lateral recesses leading direct into the discharge branch $B^5$. A helical spring in the valve chest $B^2$ prevents the inlet valve opening too high. This arrangement of pump B may also be fitted to work horizontally, but in this case, the inlet and discharge valve boxes would be set at right angles to the cylinder B, that is, for the valves to work vertically. When the oil is supplied from a cistern above to the oil piston cylinder A, hereinbefore described, a filler and cock $A^{10}$ (shown in Fig. 5), might be employed to fill the cylinder A, below the piston $A^{13}$.

In the arrangement shown in Figs. 1 and 2, the service cylinder A draws its oil before described through the pipe $a^2$ to the pipe $a$ from one of the hollow columns $z$ of the engine frame. In this case the column $z$ is made an oil vessel fitted with a stop cock at $a^4$, the oil passing through a three-way cock $a^3$ shown in Fig. 11. This cock is attached by its lateral branch $a^5$ to a service filtering chest C, shown in Figs. 12 and 13. When the cock is turned at right angles it shuts off the connection between the pipe $a$ and the pipe $a^2$ and opens that between the pipe $a$ and the distributing service filter box C to supply the oil to the several service pipes $c$, $b$, $b'$. This vessel is provided with a perforated partition C' and is fitted with a removable screw cover $C^2$ for cleaning, as seen particularly in Fig. 13. The several service pipes $c$, $b$, $b'$ lead to the new or improved lubricating fittings of the different moving and working parts of the engine as will hereinafter be described. The pipe $c$ conducts the oil to the fixed horizontal common service pipe $c'$ secured over the top of the column $z$. This pipe leads the oil to the cocks $d$ $d'$, shown at D', in Figs. 1, 2, 14 and 15, which regulate and supply the oil to the working surfaces of the guides $z'$ on the column frames and the slides $z^2$ of the cross head $z^3$. The pipe $b$ from the service filter box C supplies the opposite slides and guides $z'$, $z^2$. Each chest $d$ is fitted with one or more branches $c^4$ to lead the oil to different points. The boxes $d$ have a disk valve $d'$ shown in Figs. 16, 20 and 22 with holes $d^9$ corresponding in size and number to the branches $c^4$, Figs. 16 and 20 to 24 inclusive. The disk valve $d'$ is actuated by a spindle $d^2$ and works on a turned face in the bottom of the chest $d$, over the branches $c^4$. The spindle $d^2$ passes out through a liquid-tight cover $d^3$ fitted with a cup leather $d^6$ and expanding split metal ring $d^7$ and bush $d^8$ with helical spring at $d^{10}$ as shown in the sectional views Figs. 20 to 23. This arrangement of the cover dispenses with stuffing box packing on the spindle $d^2$, the cup ring $d^6$ being expanded to grip the rod and the recess in the cover of the joint by the spring ring $d^7$. The spindle $d^2$ is turned by a hand wheel $d^4$ which is provided with divisions, and a fixed index pointer $d^5$ projecting up from the cover $d^3$ shows the position of the disk valve $d'$. Thus the supply of oil to the service branches $c^4$ may be regulated. The common supply tube $c'$ also supplies oil through two of the double swiveling or T-branches $e$ E' fitted thereon, as shown in enlarged sectional view in Fig. 16. From the branches $e$ E', the oil passes by the tubes $c^2$ $c^3$ to the intermittent automatic syringe dippers J (Figs. 25 and 26) carried on these swiveling branches and tubes, over the oil cups at G, G', G². By means of the swiveling joints $e$, E', these dippers J can be adjusted. From the oil cups G G' the oil is led by the tubes $g$ from the cups G to the crank or crank pin at the lower end of the connecting rod at Z² by the tubes $g'$ to the upper journals at G' of the cross-head $z^3$, and by the tubes $g^2$ to the outer journals at G² of the cross-head, see Fig. 2.

Referring to Figs. 1 and 2, and 16 to 18 the swiveling T-branch $e$, E' consists of a central branch pipe $e$ secured by turned and screwed couplings $e'$ at its outer ends to the ends of the service pipe $c'$ and in line therewith. The pipe $e$ has a turned boss $e^2$, in the center where the lateral branch $e^3$ is formed, and fitted over this turned boss is the hollow branch E'. This branch is embraced liquid-tight by the flanged bosses E E, of two stuffing boxes E³ mounted on the boss $e^2$ of the branch $e$ $e$. These stuffing boxes are bolted together by bolts as shown in the end view Fig. 17. Thus the branch pipes E' and $c^2$ can swivel at right angles, liquid-tight on the central boss $e^2$ of the branch $e$, so as to raise the branch pipes $c^2$ and automatic lubricators J out of the way of their oil cups G, G'. By these means the covers of the bearings or working parts can be got at without disturbing the main service pipes $c'$.

A swiveling joint is made at E' by fitting on the end of the branch pipe $c^2$ a stuffing gland E² with flanges to be bolted to the branch E', shown in end view in Fig. 18. This enables the branch pipe $c^2$, with the automatic lubricators J and the branch pipe $c^3$ to be swiveled at right angles to the former joint $e$, E', to take these lubricators laterally away from their receiving oil cups G, G', G², as shown turned out in this position at $x$ on the left hand side of Fig. 2.

Each bearing to be lubricated and its oil cup G has its service pipe and branch $c^4$ fitted with a regulating valve case $d$ as indicated at D. A separate branch $c^3$ is led from the branch $c^2$ with a regulating valve at D⁵ to carry the service tube $c^5$ and lubricator J, to deliver the oil into the receiving cup G² of the outer ends of the cross-heads $z^3$ as shown on the right of Figs. 2 and 16. The pipe $b'$ leading from the chest C (Fig. 2) is connected to the cross pipe $b^2$ by a swiveling T coupling as at $b^5$, and angle branches are connected to the pipe $b^2$ by single swiveling joints as at $b^3$.

Fig. 19 shows a sectional elevation detached of one of these swiveling joints $b^3$ to a large scale, formed of two glands $b^7$, $b^8$ screwed together to form an internal swivel joint $b^3$. The bracket D⁴ is for securing the joint to a fixed part of the engine.

A further improvement of our system consists of an automatic oil dipper J shown in sectional elevation with the moving parts in their normal and discharging positions respectively in Figs. 25 and 26. These dippers J are attached by screw stems I, I' with jam nuts, to the lower ends of the oil serving tubes $c^4$, $c^5$ leading to the reciprocating parts of the engine. Such reciprocating parts of the engine are provided with an oil cup or a concave part G⁴, which, as the part rises, presses against the lower nozzle end J' of the syringe. This syringe is formed of a hollow cylinder J, bored at its upper end J² to fit a hollow piston I² formed on the lower inner end of the screw tube I, which is passed in through a screw stuffing cover J⁵. A lateral orifice $i$ in the center of the piston part I² opens into an annular wide part $j$ in the bored cylinder J². A perforated division J³ is formed in the center of the hollow cylinder J, with a strong helical spring $i'$ fitted between it and the lower end of the piston I², so as to press this division J³ and the cylinder J down from the piston I² until the cover J⁵ stops against the upper end of the piston I², as shown in Fig. 25. In this position the oil passes from the tube I into the lower bored part J² of the cylinder J as indicated by the arrows in this figure. The hollow stem of the disk valve $j^2$ has a light helical spring $j^3$ fitted over it, resting on the lower screw plug J' in a bored part $j^4$ of which the lower stem of the valve $j^2$ works. This spring pressing the disk $j^2$ against the division J³ closes the perforations $j'$ when the cylinder J is pressed down by the spring $i'$, as shown in Fig 25. But when a lubricating cup comes up and strikes the lower end J' of this lubricating cylinder J, as shown at G⁴ in Fig. 26, the spring $i'$ is compressed and the oil is forced out of the chamber J² through the perforations $j'$ and out through the hollow stem of the valve $j^2$, and lower end J' of the syringe, the pressure of the oil acting on the valve $j^2$ opening it by compressing the light spring $j^3$ as shown and indicated by the arrows in Fig. 26.

Fig. 27 shows an elevation and plan of one of the disk valve boxes $d$, more particularly described in reference to and shown in Figs. 14 to 18 and 20 and 21. This Fig. 27 shows the outlet branches $c^4$ leading to the feed pipes $d^{11}$ from the boxes $d$. The swivel jointed couplings $c^6$ allow these feed branches $d^{11}$ to swivel either vertically or horizontally to or out of the way of the bearings to be lubricated. Fig. 27 also shows a pointer $d^5$ on the cross handle $d^4$ on the top of the spindle $d^2$ of the valve, instead of a stile pointer $d^5$ as described in reference to the former figures. This pointer is fitted nearly close down to the cover $d^3$ of the valve chest $d$, so that the divided index is cut on the corner opposite the cross hand pointer $d^5$ instead of on the hand-wheel $d^4$ of the former arrangements opposite the stile pointer $d^5$.

Fig. 28 shows a sectional elevation of a single swiveling joint $e^2$, E′, for fitting on the ends of the oil service pipes $c'$ (where the tube $c^2$ leading to the bearings to be lubricated has to be raised out of the way, when the bearings have to be tightened up), equivalent to, and as a substitute for, the swiveling tube joint shown in Figs. 16 and 19. In this arrangement the fixed central hollow boss $e^2$ on the end of the tube $c'$ has a small hole $e^3$ in it, leading to the service tube $c^2$, so that the oscillating eye E′ on this boss to which the service tube $c^2$ is coupled at E², in being lifted or turned up, shuts off the passage $e^3$ of the oil to the service tube $c^2$ and prevents leakage or waste. The fixed boss $e^2$ has a solid end projecting through one of its gripping flanges E to which the bracket D⁴ is screwed for securing the supply pipe $c'$ and boss $e^2$ to the columns $x$ or any fixed part of the framing; otherwise it is constructed substantially as shown in the said other Figs. 16 and 19. But to insure tightness of the swiveling flanges E E, of these couplings, their inner eyes where they swivel on the boss $e^2$ and tubes are shown as formed with grooves for the insertion of small cup leather rings $d^6$ and internal spring metal rings $d^7$ for making these working parts E on these tubes liquid tight, the same as the rings shown in Figs. 23 and 24 to a larger scale. And these cup leather rings $d^6$ may be applied to the swiveling joint flanges E of any of these couplings as indicated to a large scale in section in Fig. 29.

We claim as our invention—

1. In a system for automatically lubricating the working parts of machinery, the combination of a weighted service cistern distributing filter boxes connected therewith, with feed and oscillating service pipes leading from the filter boxes and having swiveling joints and intermittent feed syringe dippers operated by the oil box of the part to be lubricated and shutting off and regulating valves, all substantially as described.

2. In a system for automatically lubricating the working parts of machinery, the combination of a supply cistern, distributing filter boxes connected therewith, with feed pipes leading from the filter boxes and provided with valves $d$ $d'$ having spindles and indicating fittings, the said feed pipes being also provided with swivel jointed pipes, shutting off cocks and devices operated by the moving parts of the engine for feeding the oil thereto, all substantially as set forth.

3. In a system for automatically lubricating the working parts of machinery, the combination of an oil service cistern, filter box connected with the cistern and main service pipes leading from the filter box, with local service pipes, and single and double swiveling joint couplings between the main and the local service pipes, substantially as set forth.

4. In a system for automatically lubricating the crank pins, cross-heads, lever links, and other like moving parts of engines, and other machinery, the combination of an oil service cistern, filter box connected therewith and main service pipes leading from the filter box, with local service pipes, each provided with automatic feed oil forcing syringe dipper having a moving oil box adapted to be operated by the moving oil box of the part to be lubricated, substantially as set forth.

5. In a system for automatically lubricating the crank pins, cross-heads, lever links, and other like moving parts of engines and other machinery, the combination of an oil service cistern, filter box connected therewith and main service pipes leading from the filter box, with local service pipes each provided with moving syringe cylinder J the said cylinder being provided with a perforated division J³, a hollow piston I², lateral orifice $i$, helical springs $i'$ $i^3$ and disk valves $i^2$, substantially as and for the purposes set forth.

In testimony whereof we have signed our names to this specification in the presence of two subscribing witnesses.

ALEXANDER G. HAY.
MALCOLM McINTYRE.

Witnesses:
W. R. M. THOMSON,
JOHN SIME,
Both of 96 Buchanan Street, Glasgow.